United States Patent [19]
Satsuma et al.

[11] Patent Number: 5,889,105
[45] Date of Patent: *Mar. 30, 1999

[54] AQUEOUS DISPERSION-TYPE ACRYLIC POLYMER

[75] Inventors: Michio Satsuma; Yutaka Tosaki, both of Osaka, Japan

[73] Assignee: Nitto Denko Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 644,934

[22] Filed: May 13, 1996

Related U.S. Application Data

[63] Continuation of Ser. No. 363,328, Dec. 23, 1994, abandoned.

[30] Foreign Application Priority Data

Dec. 23, 1993 [JP] Japan ................................ 5-346105

[51] Int. Cl.$^6$ ................................... C08L 33/06
[52] U.S. Cl. ................ 524/560; 524/548; 524/555; 524/556; 524/558; 524/559; 524/808; 524/831; 524/832; 524/833; 526/329.7
[58] Field of Search ................... 524/808, 831, 524/832, 833, 560, 555, 556, 548, 558, 559; 526/329.7

[56] References Cited

U.S. PATENT DOCUMENTS

| | | | |
|---|---|---|---|
| 3,364,182 | 1/1968 | Griffith | 526/329.7 X |
| 3,637,563 | 1/1972 | Christena | 524/832 X |
| 3,926,888 | 12/1975 | Cheung et al. | 524/832 |
| 3,954,724 | 5/1976 | Nakashio et al. | 526/329.7 X |
| 4,139,691 | 2/1979 | Nakai et al. | 526/329.7 X |
| 4,305,859 | 12/1981 | McEwan et al. | 524/832 X |
| 4,316,830 | 2/1982 | Mallon | 524/833 X |
| 4,336,172 | 6/1982 | Marquardt et al. | 524/831 X |
| 4,384,096 | 5/1983 | Sonnabend | 524/833 X |
| 4,477,623 | 10/1984 | Pons et al. | 524/832 X |
| 4,517,344 | 5/1985 | Mitani et al. | 526/329.7 X |
| 4,560,724 | 12/1985 | Brabetz et al. | 524/832 X |
| 4,727,110 | 2/1988 | Fan et al. | 524/832 X |
| 4,898,909 | 2/1990 | Vietmeier et al. | 524/831 X |
| 4,925,908 | 5/1990 | Bernard et al. | 524/832 X |
| 4,937,282 | 6/1990 | Pfoehler et al. | 524/831 X |
| 4,966,939 | 10/1990 | Craig | 524/833 X |
| 5,011,867 | 4/1991 | Mallya et al. | 524/833 X |
| 5,100,955 | 3/1992 | Pons et al. | 524/832 |
| 5,164,444 | 11/1992 | Bernard | 524/833 |
| 5,194,539 | 3/1993 | Charmot et al. | 524/832 X |
| 5,240,771 | 8/1993 | Brueckmann et al. | 526/329.7 X |
| 5,278,227 | 1/1994 | Bernard | 527/833 X |
| 5,405,693 | 4/1995 | Dittrich et al. | 524/833 X |

FOREIGN PATENT DOCUMENTS

A0048084  3/1982  European Pat. Off. .

*Primary Examiner*—Judy M. Reddick
*Attorney, Agent, or Firm*—Sughrue, Mion, Zinn, Macpeak & Seas, PLLC

[57] ABSTRACT

A process for producing an aqueous dispersion-type acrylic polymer is disclosed, which comprises introducing a monomer comprising an alkyl (meth)acrylate as the main component into a polymerization vessel at a time at a monomer concentration of 40% by weight or higher, adding a water-soluble radical polymerization initiator thereto in an amount of from 0.001 to 0.05 parts by weight per 100 parts by weight of the monomer, and emulsion-polymerizing the monomer substantially at 20° to 60° C. The aqueous dispersion-type acrylic polymer thus obtained satisfies the equation log M>3log S-2, wherein S is a tetrahydrofuran (THF)-soluble content (wt %) of the polymer and M is a weight-average molecular weight (×10,000) of a soluble part of the polymer. This polymer is preferably used for a pressure-sensitive adhesive in pressure-sensitive adhesive-covered products.

8 Claims, 1 Drawing Sheet

FIGURE
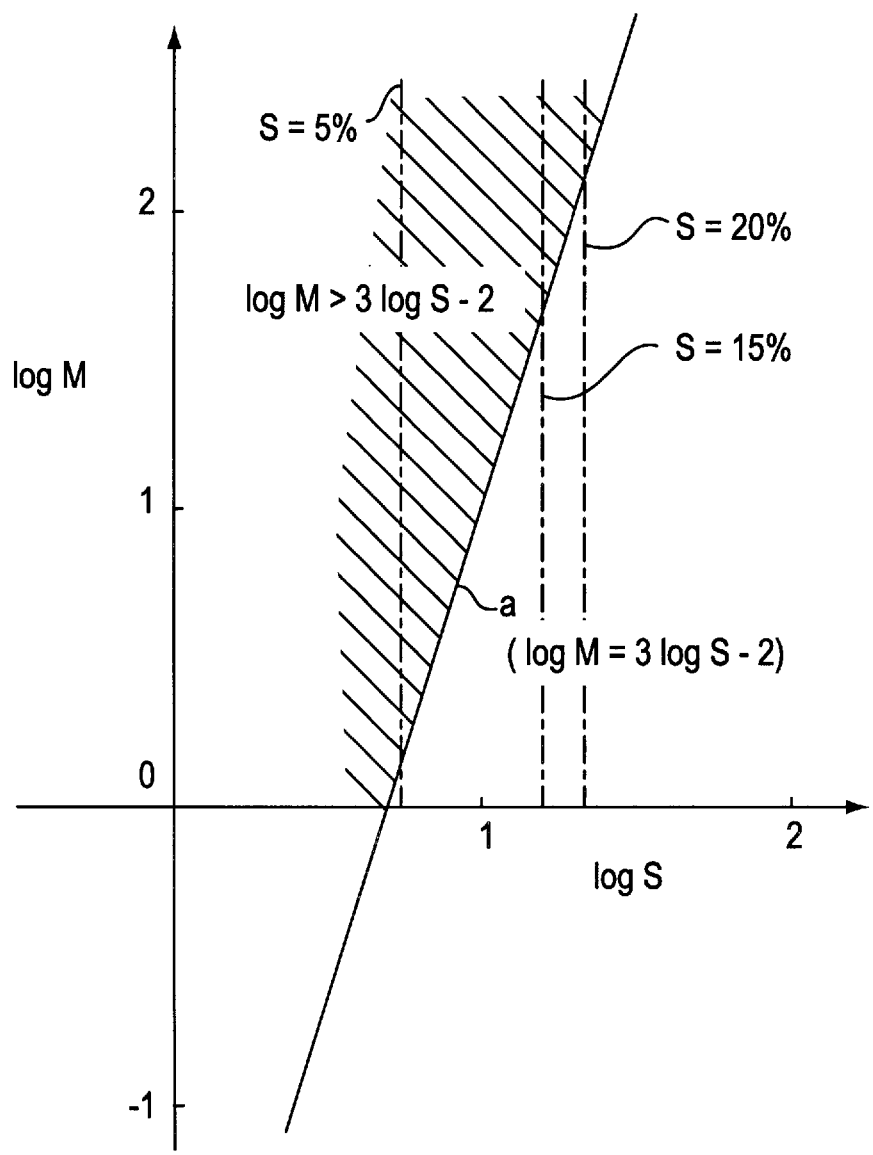

AQUEOUS DISPERSION-TYPE ACRYLIC POLYMER

This is a Continuation of application Ser. No. 08/363,328 filed Dec. 23, 1994, now abandoned.

FIELD OF THE INVENTION

The present invention relates to a process for producing an aqueous dispersion type acrylic polymer, the acrylic polymer thus obtained, and a pressure-sensitive adhesive comprising the acrylic polymer.

BACKGROUND OF THE INVENTION

Emulsion polymerization in an aqueous medium is utilized for the production of various polymers because of freedom from the danger of fire and environmental pollution due to the unnecessity of any organic solvent. In the production of an acrylic polymer by emulsion polymerization, ammonium persulfate is frequently used as a water-soluble radical polymerization initiator in an amount of usually from 0.1 to 0.5 parts by weight per 100 parts by weight of the monomer, and the polymerization is conducted usually at a temperature of 60° C. or higher, with the decomposition temperature of the initiator being taken into account. In the case of mass production, the monomer-dropping method in which a monomer emulsion is dropped into the polymerization system little by little is generally employed to conduct emulsion polymerization because feeding a monomer at a time in mass production makes the control of heat generation by polymerization difficult.

The acrylic polymer produced by such conventional emulsion polymerization contains a considerable proportion of a low molecular weight component. The presence of this low molecular weight component seems to be desirable because it enhances tack in pressure-sensitive applications such as adhesive tapes. However, where the polymer is used over a prolonged period of time in a high temperature range or under high load or used in applications where an end-peeling force is applied or a plasticizer is present, the adhesiveness of the polymer to an adherend often becomes poor. This is because the low molecular weight component blooms even though the cohesive force of the polymer has been increased by post-crosslinking alone. In re-strippable applications, the conventional acrylic polymer also has a problem that the low molecular weight component blooms on the surface of the adherend to stain the adherend upon re-stripping.

Because of the above, polymers for the above adhesive applications preferably have a low molecular weight component content which is as low as possible. However, diminishing the low molecular weight component in a polymer is never easy, although increasing the low molecular weight component can be easily attained by increasing the amount of a chain transfer agent. A reduction of the content of the low molecular weight component seems to be attained by reducing the amount of ammonium persulfate used as a polymerization initiator to below the lower limit of the above specified range or by lowering the polymerization temperature to below 60° C. However, the polymerization reaction is almost stopped under such conditions, so-that the desired acrylic polymer is difficult to produce.

Another method which seems to be usable to obtain the desired polymer is to remove the low molecular weight component after emulsion polymerization in place of inhibiting the formation of a low molecular weight component during emulsion polymerization. For example, polymer reprecipitation and cleaning the pressure-sensitive adhesive on an adhesive tape with an organic solvent are known. However, such techniques are costly and laborious and are hence undesirable for practical use.

As described above, a process for industrially advantageously producing an acrylic polymer having a reduced low molecular weight component content has not been found so far, which polymer is strongly desired in pressure-sensitive applications such as adhesive tapes.

SUMMARY OF THE INVENTION

An object of the present invention is, under these circumstances, to provide a process which can directly produce a high molecular weight acrylic polymer having a reduced low molecular weight component content through emulsion polymerization in an aqueous medium and which therefore does not especially need the procedure for removing a low molecular weight component after emulsion polymerization.

As a result of intensive studies to accomplish the above object, it was found that an acrylic polymer having a reduced low molecular weight component content can be obtained when a radical polymerization initiator having a low decomposition temperature, e.g., ammonium persulfate or 2,2'-azobis [2-(2-imidazolin-2-yl)propane], is used as a water-soluble radical polymerization initiator in an amount considerably smaller than the conventional ones to emulsion-polymerize a monomer in an aqueous medium at a temperature lower than the conventional ones, with the monomer being fed not dropwise but at a time.

Further investigations were made based on the above finding. As a result, the present inventors found that not only the acrylic polymer obtained by the above-described method has an exceedingly high molecular weight, but also that part of the polymer which is soluble in tetrahydrofuran (hereinafter referred to as "THF") has an exceedingly high molecular weight for the low THF-soluble content attributable to a very small number of crosslinks formed during polymerization. It is generally known that as the degree of crosslinking of a polymer increases, the solvent-soluble content of the polymer decreases and, simultaneously therewith, the molecular weight of the soluble part decreases. In contrast to this knowledge, the polymer obtained by the above-described method has an exceedingly high molecular weight of the soluble part as compared with conventional polymers having the same soluble content.

A closer examination of such a phenomenon was conducted by the present inventors, and has revealed that there is a specific relationship between the soluble content and the molecular weight of the soluble part as shown in the attached Figure. The Figure shows the relationship between the THF-soluble content of the polymer formed and the molecular weight of the THF-soluble part, with the logarithm of the soluble content S (%) being plotted as abscissa and the logarithm of the weight-average molecular weight M (×10, 000) of the soluble part as ordinate. All the plots for the acrylic polymers obtained by the above-described method have been found to be present in the hatched region on the left side of log M=3log S-2 indicated by straight line a, that is, present within the region defined by log M>3log S-2.

These acrylic polymers which satisfy the above-described relationship are polymers having an exceedingly reduced low molecular weight component content and can hence be utilized as they are in pressure-sensitive applications such as adhesive tapes without the necessity of any procedure for removing a low molecular weight component after polymerization. In these applications, those acrylic polymers have been found not to cause problems attributable to the blooming of a low molecular weight component, such as poor adhesion to adherends and staining of adherends upon re-stripping.

The present invention has been achieved based on the above-described findings. The present invention provides a process for producing an aqueous dispersion-type acrylic polymer which -comprises introducing a monomer comprising an alkyl (meth)acrylate as the main component into a polymerization vessel at a time at a monomer concentration of 40% by weight or higher along with an aqueous medium containing an emulsifying agent, adding a water-soluble radical polymerization initiator thereto in an amount of from 0.001 to 0.05 parts by weight per 100 parts by weight of the monomer, and emulsion-polymerizing the monomer at 20° to 60° C.

The present invention also provides a polymer which satisfies the equation log M>3log S-2 wherein S is the THF-soluble content (%) of the polymer and M is the weight-average molecular weight (×10,000) of the soluble part of the polymer.

The present invention further provides a pressure-sensitive adhesive comprising the acrylic polymer.

BRIEF DESCRIPTION OF THE DRAWING

The FIGURE shows the relationship between the tetrahydrofuran-soluble contents in acrylic polymers obtained by the present invention and the weight-average molecular weights of the soluble parts of the polymers.

DETAILED DESCRIPTION OF THE INVENTION

The monomer used in the present invention comprises an alkyl (meth)acrylate as the main component. That is, the content of the alkyl (meth)acrylate is at least 50% by weight based on the weight of the total monomers. The alkyl (meth)acrylate preferably has from 1 to 18 carbon atoms in the alkyl moiety. Other monomers that may be used if desired include carboxylated monomers, e.g., maleic anhydride, (meth)acrylic acid, and itaconic acid; hydroxylated monomers, e.g., hydroxyalkyl (meth)acrylates; vinyl acetate; styrene; nitrogenous monomers, e.g., (meth)acrylonitrile, N-vinylpyrrolidone, (meth)acryloylmorpholine, cyclohexylmaleimide, (meth)acrylamide, and N,N-dimethyl(meth)acrylamide; and monomers containing a glycidyl group, e.g., glycidyl (meth)acrylate. Also usable are crosslinking monomers such as, e.g., trimethylolpropane tri(meth)acrylate. However, monomers which give a polymer having a glass transition temperature ($T_g$) of –20° C. or lower are preferred when the polymer is for use as a pressure-sensitive adhesive. This is because the polymer obtained by this invention has a high molecular weight and hence lower $T_g$'s tend to bring about higher initial adhesion.

The emulsifying agent used for emulsifying these monomers into an aqueous medium may be nonionic or anionic or of another type. An emulsifying agent having a copolymerizable unsaturated group is preferred. This is because use of such an emulsifying agent results in a reduced free-emulsifier content, so that the amount of the emulsifying agent which blooms on the polymer surface upon drying of the polymer emulsion after polymerization can be reduced. Examples of such a copolymerizable emulsifying agent include those obtained by introducing a propenyl group into hydrophobic groups of polyoxyethylene alkylphenyl ethers and of the sulfate salts thereof. The- amount of the emulsifying agent used is not particularly limited, but it usually is from 0.5 to 5 parts by weight per 100 parts by weight of the monomer.

The water-soluble radical polymerization initiator for use in the present invention has a decomposition temperature (10 hour half-life temperature) in water of usually 70° C. or lower, and preferably 60° C. or lower. Examples of the initiator include azo initiators such as those enumerated below and redox initiators comprising combinations of either water-soluble organic peroxides, e.g., t-butyl hydroperoxide, t-butylperoxymaleic acid, and hydrogen peroxide, or persulfates, e.g., ammonium persulfate, and reducing agents, e.g., polyamines, ferrous salts, triethanolamine, and ascorbic acid. From the standpoints of adherend-nonstaining property, noncorrosive property, water resistance, etc., water-soluble organic initiators are the most desirable.

Examples of azo initiators include 2,2'-azobis[2-(2-imidazolin-2-yl)propane] (decomposition temperature, 61° C. in methanol),2,2'-azobis[2-(5-methyl-2-imidazoline-2-yl) propane] dihydrochloride (decomposition temperature, 41° C. in water), and 2,2'-azobis[2-(5-hydroxy-3,4,5,6-tetrahydropyrimidin-2-yl)propane] dihydrochloride (decomposition temperature, 59° C. in water). Especially preferred of these from the standpoint of nonstaining property is 2,2'-azobis[2-(2-imidazolin-2-yl)propane], which does not contain a chloride in the molecule.

In the present invention, the monomer comprising an alkyl (meth)acrylate as the main component is first introduced at a time into a polymerization vessel along with an aqueous medium containing an emulsifying agent. The monomer concentration is generally 40% by weight or higher, and preferably from 45 to 60% by weight. This method in which the monomer is fed at a time is intended to avoid drawbacks of the monomer-dropping method, such as the instability of polymerization reaction. Although such a method in which a monomer is fed at a time may be thought to have a problem concerning the control of polymerization heat, the process of this invention is free from this problem. This is because in this invention, the monomer is reacted at low temperature using an initiator in a reduced amount. The aqueous medium may be water alone, or may be a mixture of water and a small proportion of a water-soluble solvent.

The contents in the vessel are then stirred sufficiently to obtain a homogeneous monomer emulsion. A water-soluble organic radical polymerization initiator is added thereto in an amount of from 0.001 to 0.05 parts by weight per 100 parts by weight of the monomer, while the atmosphere in the vessel is continuously replaced with nitrogen gas. The monomer is thus emulsion-polymerized at 20° to 60° C. Methods for adding the initiator are not particularly limited. In the case of a redox initiator comprising an organic peroxide and a reducing agent, for example, the two ingredients may be introduced in such a manner that either of the two is added first and the other is added--at a time, portionwise, or continuously.

Methods for heating are also not particularly limited. The reaction mixture may be regulated to have a temperature in the above-specified range before, during, or after the addition of the water-soluble organic radical polymerization initiator. This temperature regulation may be conducted in two steps according to the kind of the initiator used. For example, the reaction is first performed at a low temperature of 20° to 50° C. to increase the degree of polymerization as high as possible at that temperature, and the reaction is then further performed at a higher temperature of 50° to 60° C. to allow the polymerization to proceed to a desired degree of polymerization. If the amount of unreacted monomer in the system is small (for example, 5% by weight or less) and the polymerization system is not substantially influenced even if the temperature is raised, the reaction may be conducted at high temperature exceeding 60° C.

As described above, the acrylic polymer thus obtained satisfies the equation log M>3log S-2 as shown the Figure wherein S (%) is the THF-soluble content of the polymer and M (×10,000) is the weight-average molecular weight of the THF-soluble part, with the logarithm of the soluble content S being plotted as abscissa and the logarithm of the weight-average molecular weight M as the ordinate.

The soluble content S (%) is determined by flow-casting the emulsion obtained by emulsion polymerization on a stirippable substrate at a thickness of 50 μm on a dry basis, drying the coating, peeling off the acrylic polymer, wrapping a given amount [X] (usually 0.05 to 2.0 g) of the polymer with a polytetrafluoroethylene membrane having a maximum pore diameter of 0.2 μm and a thickness of about 80 μm, immersing the wrapped acrylic polymer in THF solvent at 23° C. for 2 weeks to extract any solvent-soluble matter, measuring the weight [Y] of the extract after drying, and calculating the soluble content S using the equation S(%)= (Y/X)×100. The weight-average molecular weight M (×10,000) of the soluble part is determined by gel permeation chromatography (GPC).

This acrylic polymer is a high molecular weight acrylic polymer having a reduced low molecular weight component content, so that it can be subjected as it is to pressure-sensitive applications such as adhesive tapes without the necessity of removing a low molecular weight component after emulsion polymerization.

A pressure-sensitive adhesive-covered product such as a pressure-sensitive adhesive tape can be obtained by, for example, adding various conventional additives such as a crosslinking agent, a tackifier, a plasticizer, and a pigment to the acrylic polymer if desired and necessary, applying this polymer to a substrate, and drying the coating to form a pressure-sensitive adhesive layer having a desired thickness.

This pressure-sensitive adhesive-covered product has a high cohesive force and is excellent in heat resistance and other properties. It is sufficiently usable even in a high temperature range or under high load or even in applications where an end-peeling force is applied or a plasticizer is present. In particular, this adhesive tape is free from the conventional problem of poor adhesion to adherends attributable to the blooming of a low molecular weight component. In re-strippable applications also, the adhesive tape does not stain the adherends.

Therefore, by utilizing this re-strippability, the pressure-sensitive adhesive-covered product can be used for surface protection of a metal or the like, surface protection of a coated surface of automobiles or the like, processing such as cutting or polishing of a silicone wafer, or medical uses. Further, the polymer can be used as a spray-type pressure-sensitive adhesive as it is.

Other preferred use example is as follows. For example, where a pressure-sensitive adhesive-covered product is produced by applying a pressure-sensitive adhesive coating to a back surface of a sheet-like product such as a tile carpet which is laid on a floor, a strippable film is in general temporarily adhered to the surface of the coating to protect the coating surface, but if the polymer of the present invention is used as a pressure-sensitive adhesive coating, there is an advantage that even if the coating surfaces are mutually adhered, the coatings can easily and surely be separated each other even with the lapse of time due to its high cohesive property, and a strippable film is not necessary. It can be understood that this use example can also be applied to film-like, sheet-like and tape-like products.

As described above, according to the present invention, a high molecular weight acrylic polymer having a reduced low molecular weight component content can be directly obtained by emulsion polymerization in an aqueous medium, so that any procedure for removing a low molecular weight component after emulsion polymerization is unnecessary. Moreover, since the monomer is fed at a time, mass production of emulsions is possible.

In addition, where the high molecular weight acrylic polymer obtained by the present invention has a glass transition temperature of $-20°$ C. or lower and this polymer is used in pressure-sensitive applications such as adhesive tapes, the pressure-sensitive adhesive is free from the problem of poor adhesion to adherends attributable to the blooming of a low molecular weight component and can exhibit excellent heat resistance and other properties. In re-strippable applications, the staining of adherends can be avoided and the peel strength changes little with the lapse of time. In medical applications, the pressure-sensitive adhesive causes little skin irritation.

The present invention will be explained in more detail by reference to the following Examples, but the invention should not be construed as being limited thereto. Hereinafter, all parts and percents are by -weight, unless otherwise indicated.

EXAMPLE 1

Into a 1-liter polymerization vessel were introduced 125 parts of butyl acrylate, 100 parts of 2-ethylhexyl acrylate, 12.5 parts of N,N-dimethylacrylamide, 12.5 parts of 2-hydroxypropyl acrylate, 0.03 parts of ethylene glycol diacrylate, 5.0 parts of a polyoxyethylene alkylphenyl ether having a propenyl group which had added the phenyl group (HLB=17), and 205 parts of distilled water. The contents were stirred to obtain a homogeneous emulsion having a monomer concentration of about 56%.

A 5% methanol solution of 2,2'-azobis[2-(2-imidazolin-2-yl)propane] as a water-soluble organic radical polymerization initiator was then added thereto in an amount of 0.25 parts (the initiator amount being 0.005 parts per 100 parts of the monomers) with sufficient replacement with nitrogen gas. The reaction mixture was maintained at 40° C. for 12 hours to conduct emulsion polymerization. As a result, the rate of polymerization reached 95%. Thereafter, 0.1 part of the 5% methanol solution was additionally added and emulsion polymerization was conducted at that temperature for 24 hours. The resulting reaction mixture was cooled to room temperature to complete the polymerization reaction.

Part of the thus-obtained acrylic polymer emulsion was used to examine the THF-soluble content S (%) and the weight-average molecular weight M (×10,0001 of the soluble part. As a result, it was found that S=5% and M=38 (×10,000). Hence, log M=1.58 and 3log S-2=3×0.70-2=0.1. Thus, the acrylic polymer obtained was ascertained to satisfy the equation log M>3log S-2. The $T_g$ of this polymer was $-41°$ C.

EXAMPLE 2

Into a 1-liter polymerization vessel were introduced 237.5 parts of butyl acrylate, 10 parts of acrylonitrile, 2.5 of acrylic acid, 7.5 parts of an ammonium polyoxyethylene alkylphenyl ether sulfate, and 280 parts of distilled water. The contents were stirred to obtain a homogeneous emulsion having a monomer concentration of about 47%. Emulsion polymerization was carried out in the same manner as in Example 1, except that this emulsion was used. The proportion of the 2,2'-azobis[2-(2-imidazolin-2-yl)propane] used as a water-soluble organic radical polymerization initiator to the monomers was the same as in Example 1.

Part of the thus-obtained acrylic polymer emulsion was used to examine the THF-soluble content S (%) and the weight-average molecular weight M (×10,000) of the soluble part. As a result, it was found that S=25% and M=210×10,000. Hence, log M=2.32 and 3log S-2=3×1.40-2=2.2. Thus, the acrylic polymer obtained was ascertained to satisfy the equation log M>3log S-2. The $T_g$ of this polymer was -37° C.

EXAMPLE 3

Into a 1-liter polymerization vessel were introduced 230 parts of butyl acrylate, 15 parts of N-vinylpyrrolidone, 5 parts of 2-hydroxyethyl acrylate, 0.015 parts of ethylene glycol diacrylate, 7.5 parts of a polyoxyethylene alkylphenyl ether (HLB=17), and 225 parts of distilled water. The contents were stirred to obtain a homogeneous emulsion having a monomer concentration of about 53%.

Thereto was added 0.025 parts of t-butyl hydroperoxide. Subsequently, a solution prepared by dissolving 0.01 part of triethanolamine in 25 parts of water was added dropwise over a period of 24 hours with sufficient replacement with nitrogen gas, while the reaction mixture was maintained at 45° C. Thus, emulsion polymerization was conducted. The resulting reaction mixture was cooled to room temperature to complete the polymerization reaction. The total amount of the t-butyl hydroperoxide and triethanolamine used as a redox initiator was 0.014 parts per 100 parts of the monomers.

Part of the thus-obtained acrylic polymer emulsion was used to examine the THF-soluble content S (%) and the weight-average molecular weight M (×10,000) of the soluble part. As a result, it was found that S=6% and M=42 (×10,000). Hence, log M=1.62 and 3log S-2=3×0.78-2=0.34. Thus, the acrylic polymer obtained was ascertained to satisfy the equation log M>3log S-2. The $T_g$ of this polymer was -36° C.

EXAMPLE 4

Into a 1-liter polymerization vessel were introduced 25 parts of methyl acrylate, 120 parts of butyl acrylate, 100 parts of 2-ethylhexyl acrylate, 5 parts of acrylic acid, 0.02 parts of trimethylolpropane triacrylate, 7.5 parts of an ammonium polyoxyethylene alkylphenyl ether sulfate, and 270 parts of distilled water. The contents were stirred to obtain a homogeneous emulsion having a monomer concentration of about 48%.

One part of a 2.5% aqueous solution of ammonium persulfate (initiator) was then added thereto with sufficient replacement with nitrogen gas, and the reaction mixture was maintained at 50° C. for 8 hours. Thereafter, 0.5 parts of the 2.5% aqueous initiator solution was additionally added and emulsion polymerization was conducted at 50° C. for 12 hours.

Part of the thus-obtained acrylic polymer emulsion was used to examine the THF-soluble content S (%) and the weight-average molecular weight M (×10,000) of the soluble part. As a result, it was found that S=8% and M=60×10,000. Hence, log M=1.78 and 3log S-2=3×0.90-2=0.7. Thus, the acrylic polymer obtained was ascertained to satisfy the equation log M>3log S-2. The $T_g$ of this polymer was -42° C.

Comparative Example 1

A monomer emulsion having a monomer concentration of about 35% was obtained in the same manner as in Example 1, except that the amount of distilled water was changed to 371 parts. An acrylic polymer emulsion was obtained in the same manner as in Example 1, except that-this monomer emulsion was used. Part of this acrylic polymer emulsion was used to examine the THF-soluble content S (%) and the weight-average molecular weight M (×10,000) of the soluble part. As a result, it was found that S=16% and M=8×10,000. Hence, log M=0.90 and 3log S-2=3×1.2-2=1.6. Thus, the acrylic polymer obtained was ascertained not to satisfy the equation log M>3log S-2.

Comparative Example 2

An acrylic polymer emulsion was produced by emulsion polymerization in the same manner as in Example 4, except that 20 parts of 2.5% ammonium persulfate solution was used as a polymerization initiator and the polymerization temperature was changed to 60° C. Part of this emulsion was used to examine the THF-soluble content S (%) and the weight-average molecular weight M (×10,000) of the soluble part. As a result, it was found that S=12% and M=12×10,000. Hence, log M=1.08 and 3log S-2=3×1.38-2=1.24. Thus, the acrylic polymer obtained was ascertained not to satisfy the equation log M>3log S-2.

Comparative Example 3

Into a 1-liter polymerization vessel was introduced 150 parts of water. Thereto was added a solution of 0.08 parts of 2,2'-azobis[2-(2-imidazolin-2-yl)propane] as a water-soluble organic radical polymerization initiator with sufficient replacement with nitrogen gas. The reaction mixture was maintained at 40° C.

Into this vessel was then introduced dropwise over a period of 12 hours a homogeneous emulsion prepared beforehand by mixing 235 parts of butyl acrylate, 5 parts of styrene, 10 parts of 2-hydroxypropyl acrylate, 7.5 parts of a polyoxyethylene alkylphenyl ether (HLB=17), and 100 parts of distilled water. Thus, emulsion polymerization was conducted. The reaction mixture was then heated to 60° C. to further conduct emulsion polymerization at this temperature for 24 hours. The resulting reaction mixture was cooled to room temperature to complete the polymerization reaction.

Part of the thus-obtained acrylic polymer emulsion was used to examine the THF-soluble content S (%) and the weight-average molecular weight M (×10,000) of the soluble part. As a result, it was found that S=36% and M=38×10,000. Hence, log M=1.58 and 3log S-2=3×1.56-2=2.68. Thus, the acrylic polymer obtained was ascertained not to satisfy the equation log M>3log S-2.

Each of the acrylic polymer emulsions obtained in Examples 1 to 4 and Comparative Examples 1 to 3 was examined for pressure-sensitive adhesive performances. First, each emulsion was flow-cast on a 38 μm-thick primed polyester film at a thickness of 50 μm on a dry basis, and the coating was dried. The coated film was allowed to stand at 50° C. for 48 hours to produce a pressure-sensitive adhesive tape. This tape was examined for end peelability and re-strippability by the following methods. The results obtained are shown in Table 1 below.

<End Peelability Test>

The adhesive tape was cut into 1-cm width, and this tape was wound on an iron wire having a diameter of 2 mm so that the tape made three rounds. The test piece thus prepared was allowed to stand at 80° C. for 48 hours, and then examined for tape end peeling to evaluate end peelability. Test pieces which showed a lifting of 1 mm or less are indicated by o, while test pieces which showed a lifting larger than 1 mm are indicated by x.

<Re-strippability Test>

The adhesive tape was cut into a strip having a length of 10 cm and a width of 2 cm. This strip was applied to a stainless-steel plate (SUS 304) on its bright annealing finish side, allowed to stand at 50° C. for 48 hours, and then stripped. The resulting stainless-steel surface was examined for staining to evaluate re-strippability. Adhesive tapes which remained no adhesive residue are indicated by o, while adhesive tapes which remained an adhesive residue are indicated by x.

TABLE 1

|  | End peelability | Re-strippability |
| --- | --- | --- |
| Example 1 | o | o |
| Example 2 | o | o |
| Example 3 | o | o |
| Example 4 | o | o |
| Comparative Example 1 | x | x |
| Comparative Example 2 | x | x |
| Comparative Example 3 | x | x |

The results in Table 1 clearly show that the acrylic polymers obtained by the present invention can give pressure-sensitive adhesive tapes which are less apt to suffer end peeling and to stain the adherends upon re-stripping.

While the invention has been described in detail and with reference to specific embodiments thereof, it will be apparent to one skilled in the art that various changes and modifications can be made therein without departing from the spirit and scope thereof.

What is claimed is:

1. An acrylic polymer, in an aqueous dispersion, which satisfies the equation log M>3 log S-2, wherein S is a tetrahydrofuran (THF)-soluble content (wt %) of the polymer and M is a weight-average molecular weight (×10,000) of a soluble part of the polymer, wherein said polymer is obtained by a batch process comprising:

introducing a monomer at a concentration of 40% by weight or more into a polymerization vessel, wherein the monomer comprises at least 50% by weight of an alkyl (meth)acrylate, adding a water-soluble radical polymerization initiator thereto in an amount of from 0.001 to 0.05 parts by weight per 100 parts by weight of the monomer, and emulsion-polymerizing the monomer where the emulsion-polymerizing is at 20° to 60° C.; and wherein said water-soluble radical polymerization initiator is 2.2'-azobis [2-(2-imidazolin-2-yl)propane].

2. The acrylic polymer according to claim 1, wherein the alkyl (meth)acrylate has 1 to 18 carbon atoms in the alkyl moiety.

3. The acrylic polymer according to claim 1, wherein the water-soluble radical polymerization initiator has a decomposition temperature (10 hour half-life temperature) in water of 70° C. or less.

4. The acrylic polymer according to claim 1, wherein the emulsion-polymerization is initially conducted at 20° to 50° C. and is then conducted at 50° to 60° C.

5. The acrylic polymer according to claim 1, wherein the acrylic polymer has a glass transition temperature of −20° C. or less.

6. The acrylic polymer according to claim 1, wherein said monomer has a concentration of from 45 to 60% by weight.

7. The acrylic polymer according to claim 6, wherein said monomer has a concentration of from 53 to 60% by weight.

8. An acrylic polymer as claimed in claim 1, wherein the amount of the water-soluble radical polymerization initiator is from 0.001 to 0.025 parts by weight per 100 parts by weight of the monomer.

* * * * *

UNITED STATES PATENT AND TRADEMARK OFFICE
CERTIFICATE OF CORRECTION

PATENT NO. : 5,889,105
DATED : March 30, 1999
INVENTOR(S) : Satsuma et al.

It is certified that error appears in the above-identified patent and that said Letters Patent is hereby corrected as shown below:

Column 1, line 18, delete "unnecessity of" and insert --lack of necessity to use--.

Column 1, line 29, delete "a" and isnert --one--.

Column 2, line 31, delete "a" and insert --one--.

Column 2, line 31, after "time" insert --(bath process)--.

Column 2, line 33, after "only" insert --does--.

Column 2, line 34, after "method" insert --have--.

Column 2, line 35, delete "has".

Column 2, line 55, after "as" insert --the--.

Column 2, line 57, after "as" insert --the--.

Column 3, line 11, after "vessel at" delete "a" and insert --one--.

Column 4, line 32, after "at" delete "a" and insert --one--.

Column 4, line 36, delete "a" and insert --one--.

UNITED STATES PATENT AND TRADEMARK OFFICE
CERTIFICATE OF CORRECTION

PATENT NO. : 5,889,105
DATED : March 30, 1999
INVENTOR(S) : Satsuma et al.

It is certified that error appears in the above-identified patent and that said Letters Patent is hereby corrected as shown below:

Column 4, line 39, after "is fed at" delete "a" and insert --one--.

Column 4, line 57, delete "a" and insert --one--.

Column 5, line 13, after "as" insert --the--.

Column 5, line 17, delete "stirippable" and insert --strippable--.

Column 5, line 60, delete "Other" and insert --Another--.

Column 6, line 3, after "separated" insert --from--.

Column 6, line 14, delete "a" and insert --one--.

Signed and Sealed this

Twenty-ninth Day of June, 1999

Attest:

Attesting Officer

Q. TODD DICKINSON

Acting Commissioner of Patents and Trademarks